Figure 1:
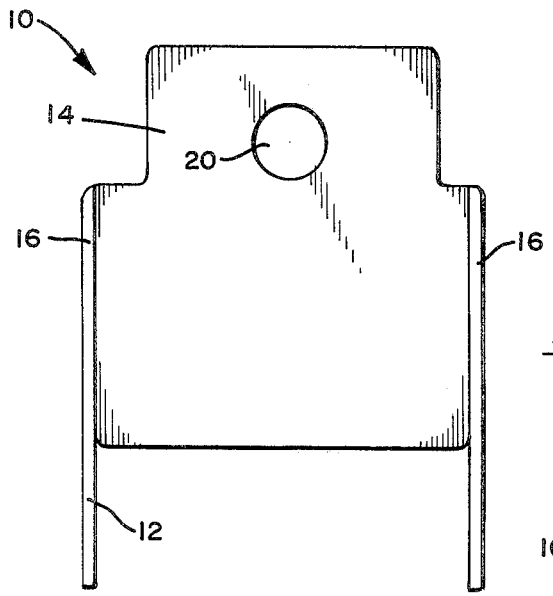
Figure 2:
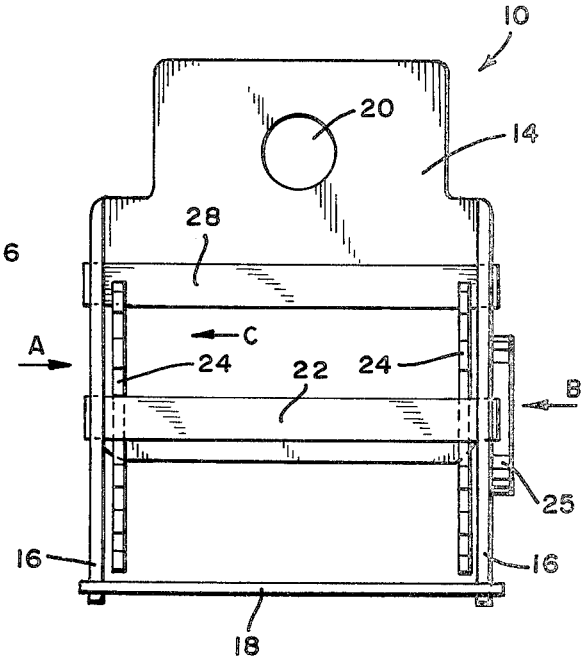
Figure 3:
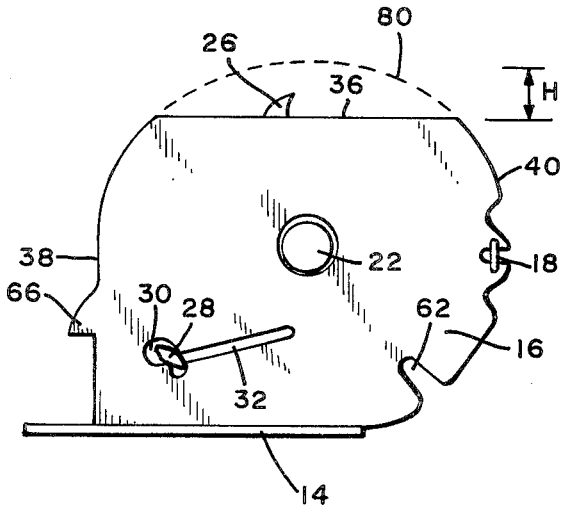
Figure 4:
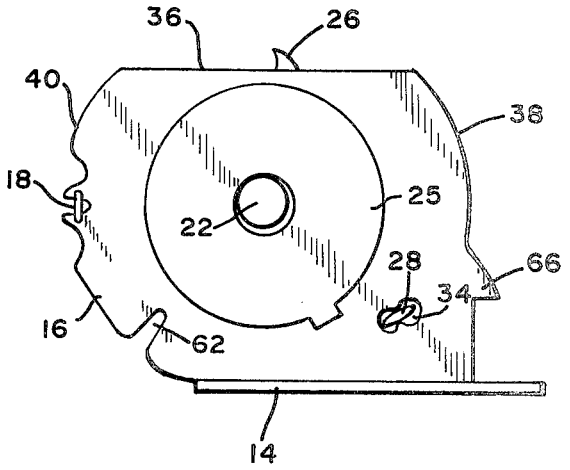
Figure 5:
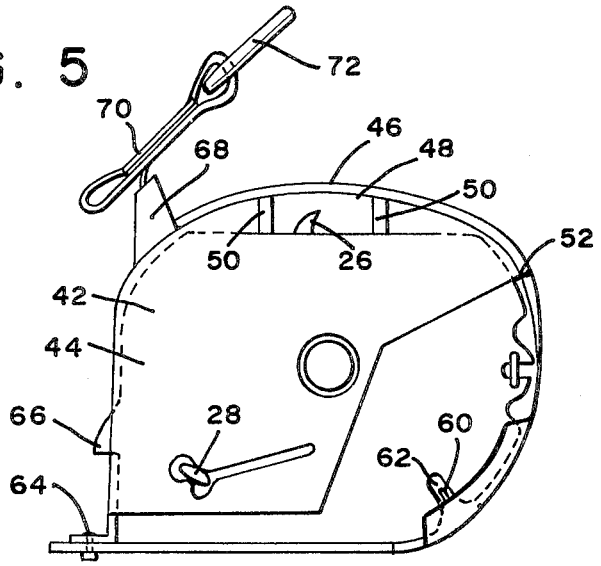
Figure 6:
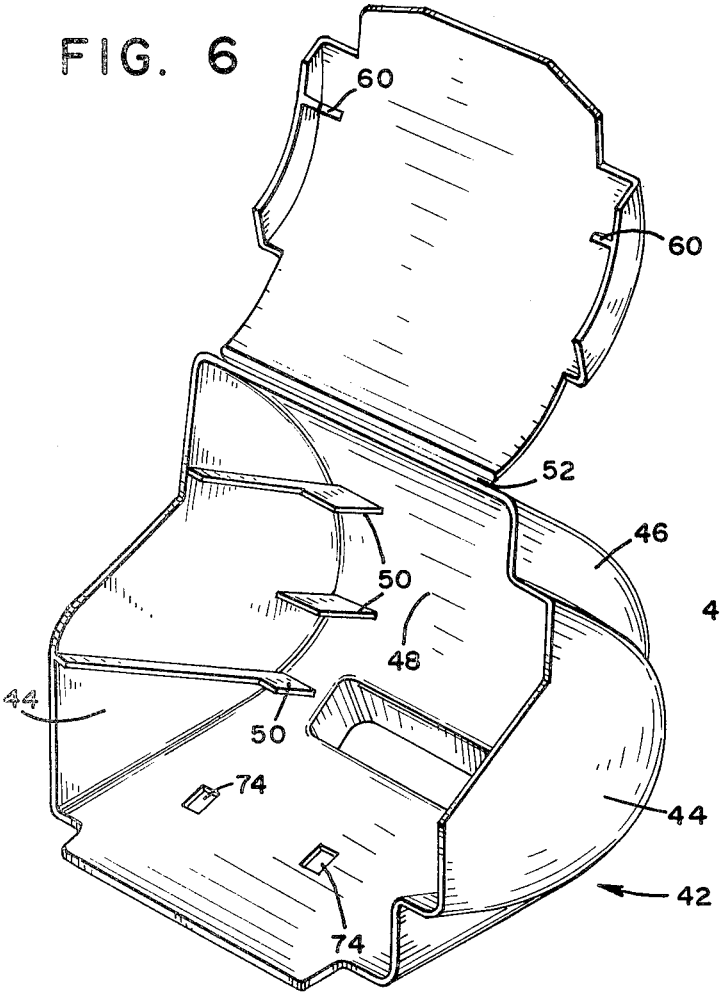
Figure 7:
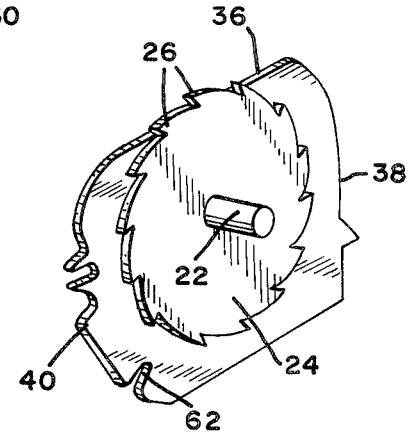

United States Defensive Publication [19] (H) [11] T985,002

Stephenson [43] Aug. 7, 1979

[54] SEAT BELT RETRACTOR BASE AND COVER

[75] Inventor: Robert L. Stephenson, Sterling Heights, Mich.

[73] Assignee: Allied Chemical Corporation, Morris Township, Morris County, N.J.

[21] Appl. No.: 916,402

[22] Filed: Jun. 16, 1978

Related U.S. Application Data

[63] Continuation of Ser. No. 821,273, Aug. 3, 1977, abandoned.

[51] Int. Cl.[2] ..... A62B 35/00; B65H 75/48

[52] U.S. Cl. ..... 242/107.4 R

[57] ABSTRACT

A seat belt retractor comprising a generally U-shaped frame comprising a central base portion and two upstanding flange portions attached to the sides of the base portion, each of the flange portions including an upper surface connecting two side surfaces, the upper surface being substantially flat; a shaft journalled for rotation in the flange portions; at least one ratchet wheel mounted on the shaft for rotation therewith and having a plurality of ratchet teeth along its outer circumference, the ratchet wheel being located adjacent to one of the flange portions and being positioned such that its outer circumference is above the height of the upper surface of the one flange portion, and cover means forming a protective cover at least around the upstanding flanges of the frame, the cover having inner and outer surfaces, the inner surfaces being provided with spacing means in contact with a portion of at least the upper surface of the one flange portion for spacing the inner surface of the cover from the outer circumference of the ratchet wheel, the spacing means further providing reinforcement to the cover to resist movement of the cover against the upper surface.

7 Claims, 2 Sheets Drawing,

10 Pages Specification

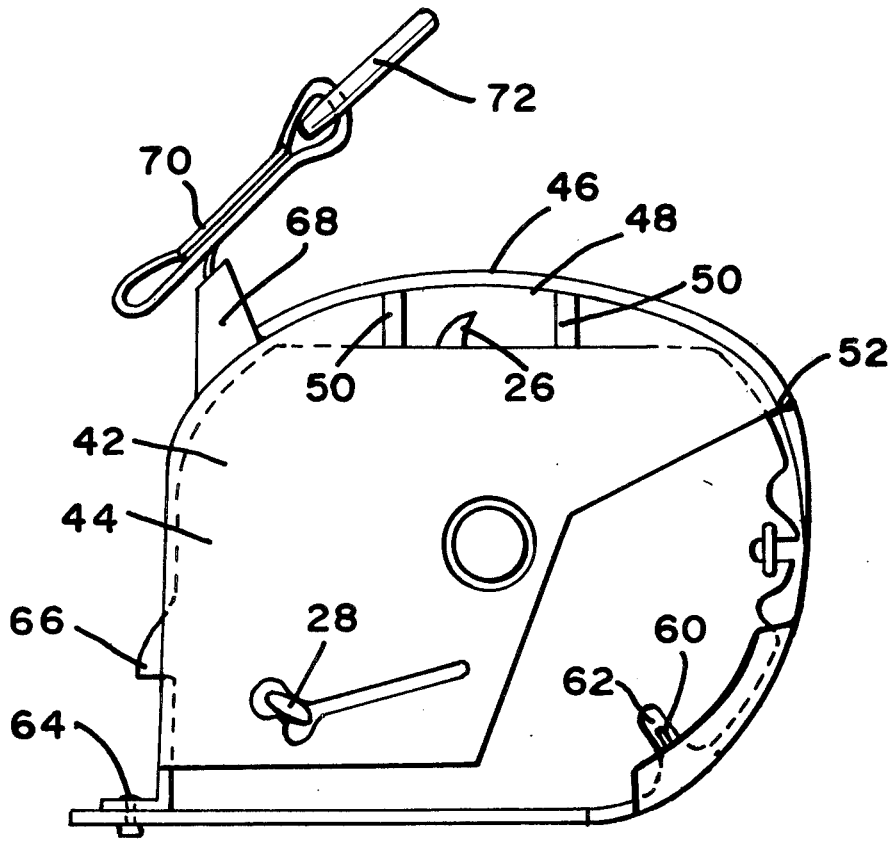

The file of this unexamined application may be inspected and copies thereof may be purchased (849 O.G. 1221, Apr. 9, 1968).